US010395155B2

(12) United States Patent
Shen

(10) Patent No.: US 10,395,155 B2
(45) Date of Patent: Aug. 27, 2019

(54) BILLBOARD CONTAINING ENCODED INFORMATION

(71) Applicant: Wei Shen, Beijing (CN)

(72) Inventor: Wei Shen, Beijing (CN)

( * ) Notice: Subject to any disclaimer, the term of this patent is extended or adjusted under 35 U.S.C. 154(b) by 0 days.

(21) Appl. No.: 15/773,250

(22) PCT Filed: Nov. 4, 2016

(86) PCT No.: PCT/CN2016/104632
§ 371 (c)(1),
(2) Date: May 3, 2018

(87) PCT Pub. No.: WO2017/076338
PCT Pub. Date: May 11, 2017

(65) Prior Publication Data
US 2018/0330211 A1 Nov. 15, 2018

(30) Foreign Application Priority Data
Nov. 6, 2015 (CN) .......................... 2015 1 0752780

(51) Int. Cl.
*G06K 19/06* (2006.01)
*G06K 7/10* (2006.01)
(Continued)

(52) U.S. Cl.
CPC ... *G06K 19/06037* (2013.01); *G06K 7/10386* (2013.01); *G06K 19/06046* (2013.01);
(Continued)

(58) Field of Classification Search
CPC ............. G06K 19/06; G06K 19/06037; G06K 19/06093; G06K 7/10; G06K 7/10386; G09F 15/02
(Continued)

(56) References Cited

U.S. PATENT DOCUMENTS 7,510,125 B2    3/2009  Look et al.
8,606,865 B2 *  12/2013 Layson, Jr. ............ G06Q 30/02
                                                    709/206
(Continued)

FOREIGN PATENT DOCUMENTS

CN        2435792 Y    6/2001
CN       101467161 A   6/2009
(Continued)

Primary Examiner — Thien M Le
(74) Attorney, Agent, or Firm — Hoffman & Baron, LLP

(57) ABSTRACT

A billboard containing encoded information comprising: a billboard body comprising a front face presenting an advertisement content; and a plurality of color blocks being distributed in a preset mode on the front face and each of which individually covering a part of the front face, wherein the plurality of color blocks are encoded as color geometric graphic code elements and the entire front face can be optically identified and decoded to obtain the encoded information when captured by a mobile terminal, and the encoded information or the information decoded by the mobile terminal and imported to a web page is associated with the advertisement content. The billboard containing the encoded information allows a user, at a normal viewing distance, to scan, identify and decode the billboard to obtain the encoded information and to perform an image indexing, thereby further improving the publicity effect of the advertisement.

22 Claims, 3 Drawing Sheets

(51) Int. Cl.
*G09F 15/02* (2006.01)
*G06Q 30/02* (2012.01)

(52) U.S. Cl.
CPC ... *G06K 19/06093* (2013.01); *G06Q 30/0241* (2013.01); *G09F 15/02* (2013.01)

(58) Field of Classification Search
USPC .......................................................... 235/494
See application file for complete search history.

(56) References Cited

U.S. PATENT DOCUMENTS

| | | | | |
|---|---|---|---|---|
| 9,710,826 | B1* | 7/2017 | Daniel | G06Q 30/0257 |
| 2007/0175998 | A1* | 8/2007 | Lev | G06K 9/6203 |
| | | | | 235/454 |
| 2012/0232988 | A1* | 9/2012 | Yang et al. | G06Q 30/02 |
| | | | | 705/14.49 |
| 2016/0253710 | A1* | 9/2016 | Publicover | H04W 4/21 |
| | | | | 705/14.66 |

FOREIGN PATENT DOCUMENTS

| | | |
|---|---|---|
| CN | 101517600 A | 8/2009 |
| CN | 101833775 A | 9/2010 |
| CN | 102147873 A | 8/2011 |
| CN | 102306273 A | 1/2012 |
| CN | 102646187 A | 8/2012 |
| CN | 102982468 A | 3/2013 |
| CN | 103033171 A | 4/2013 |
| CN | 103473518 A | 12/2013 |
| CN | 103699865 A | 4/2014 |
| CN | 104660620 A | 5/2015 |
| CN | 105373754 A | 3/2016 |
| CN | 106557798 A | 4/2017 |
| WO | 2010/031110 A1 | 3/2010 |

* cited by examiner

BILLBOARD CONTAINING ENCODED INFORMATION

CROSS-REFERENCE TO RELATED APPLICATIONS

This application is a U.S. National Stage filing under 35 U.S.C. § 371 of International Application No. PCT/CN2016/104632, filed Nov. 4, 2016, which in turn claims priority to Chinese Patent Application No. 201510752780.X, filed Nov. 6, 2015, the entire contents of which are incorporated by reference herein.

TECHNICAL FIELD

The present invention generally relates to a billboard, and particularly, to a billboard containing encoded information.

BACKGROUND ARTS

Nowadays, two-dimensional codes are widely used in daily life, and a billboard usually has a two-dimensional code on it for a function of further publicizing.

Traditionally, a two-dimensional code displayed on a billboard is always disposed at a certain location of the billboard (for example, the lower right corner). If the size of the two-dimensional code is small, a user needs to move a mobile device (for example, a smart phone, etc.) close to the billboard so that the two-dimensional code can occupy the entire scanning frame of the mobile device so as to scan a code, which is inconvenient for user operation. In particular, for a large billboard on a side of a road or on a hill, etc., a user cannot scan a two-dimensional code on the billboard with a mobile device because the user cannot approach the billboard. Therefore, a two-dimensional code on a traditional billboard of this kind will not work. However, if the area of a two-dimensional code is enlarged to a size that can be recognized at the normal viewing distance, valuable and effective advertisement area will be compromised inevitably.

In addition, a two-dimensional code on a billboard cannot act as an index means. As for an index means in other words it means that, in case, a user may hope to save the billboard together with the two-dimensional code contained thereon by taking a picture and storing an image, so as to allow others to obtain further information by scanning the two-dimensional code on the stored image. Since a traditional two-dimensional code occupies only a very small area of an image, the definition of the two-dimensional code image is low, and therefore it cannot be identified and thus cannot serve as an index.

Therefore, a billboard containing encoded information is required to address the above problem.

SUMMARY OF THE INVENTION

To address the above problem, the present invention provides a billboard containing encoded information.

The present invention provides a billboard containing encoded information, the billboard comprises a billboard body having a front face presenting advertisement content; a plurality of color blocks, the plurality of color blocks being distributed in a preset mode on the front face and each of which individually covering a part of the front face, wherein the plurality of color blocks are encoded as color geometric graphic code elements and the entire front face can be optically identified and decoded to obtain the encoded information when captured by a mobile terminal, and wherein the encoded information, or the information decoded by the mobile terminal and imported to a web page, is associated with the advertisement content.

In some embodiments, the front face of the billboard body is substantially rectangular.

In some embodiments, the front face of the billboard body is a surface of an object, and the front face presents substantially a plane.

In some embodiments, the billboard body is made of a flexible material or a rigid material.

In some embodiments, the plurality of color blocks are lithographed, printed, sprayed, pressed, engraved, glued, etched, projected or removably and magnetically attached on the front face.

In some embodiments, the shape of the plurality of color blocks is substantially the same, and the shape is a circle, a polygon, a semi-circle, an oval, a semi-oval or a combination thereof. Preferably, the polygon comprises a triangle, a square, a rectangle or a trapezoid.

In some embodiments, the area of each of the plurality of color blocks is not the same, and wherein the area of the smallest block is no less than ¼ of the area of the biggest block. In some embodiments, the area of each of the plurality of color blocks is the same.

In some embodiments, the billboard further comprises at least one locating geometric graphic block as a locating code element. Preferably, the at least one locating geometric graphic block is of three locating geometric graphic blocks, and wherein the three locating geometric graphic blocks are disposed respectively in three corners of the front face.

In some embodiments, the plurality of color blocks are distributed along with at least one edge of the front face of the billboard body. In some embodiments, the plurality of color blocks are distributed along with at least two edges of the front face of the billboard body.

In some embodiments, the area of each of the plurality of color blocks is no more than ½₀ of the area of the front face of the billboard body. In some embodiments, the area of each of the plurality of color blocks is no more than ¹⁄₄₀ of the area of the front face of the billboard body.

In some embodiments, the area of each of the locating geometric graphic blocks is no more than ½₀ of the area of the front face of the billboard body. In some embodiments, the area of each of the locating geometric graphic blocks is no more than ¹⁄₄₀ of the area of the front face of the billboard body.

In some embodiments, the number of the plurality of color blocks is greater than or equal to 3. Preferably, the number of the plurality of color blocks is 6, 8, 9, 10, 11, 12, 13, 14, 15 or 16.

In some embodiments, the mobile terminal is a smart phone.

In some embodiments, the area of the front face of the billboard body is larger than 0.2 m². In some embodiments, the area of the front face of the billboard body is larger than 0.5 m², 1 m², 5 m², and even 10 m².

The present invention also provides a method of forming a billboard containing encoded information, the method comprises following steps: forming a billboard body; forming advertisement content on the front face of the billboard body; distributing a plurality of color blocks in a preset mode on the front face and each of them individually covers a part of the front face, wherein the plurality of color blocks are encoded as color geometric graphic code elements and the entire front face can be optically identified and decoded to obtain the encoded information when it was captured by a mobile terminal, and wherein the encoded information, or the information decoded by the mobile terminal and imported to a web page, is associated with the advertisement content.

In some embodiments, the method comprises making the advertisement content be lithographed, printed, sprayed, pressed, engraved, glued, etched, projected or removably and magnetically attached on the front face.

In some embodiments, the method comprises making the plurality of color blocks be lithographed, printed, sprayed, pressed, engraved, glued, etched, projected or removably and magnetically attached on the front face.

In some embodiments, the method comprises setting the shape of the plurality of color blocks to be substantially the same, and the shape is a circle, a polygon, a semi-circle, an oval, a semi-oval or a combination thereof. Preferably, the polygon comprises a triangle, a square, a rectangle or a trapezoid.

In some embodiments, the method comprises setting the area of each of the plurality of color blocks to be not the same, and wherein the area of the smallest block is no less than ¼ of the area of the biggest block. In some embodiments, the method comprise setting the area of each of the plurality of color blocks to be the same.

In some embodiments, the method comprises, setting at least one locating geometric graphic block as a locating code element on the front face of the billboard. Preferably, the method comprises setting three locating geometric graphic blocks, and wherein the three locating geometric graphic blocks are disposed respectively in three corners of the front face.

In some embodiments, the method comprises distributing the plurality of color blocks along with at least one edge of the front face of the billboard body. In some embodiments, the method comprises distributing the plurality of color blocks along with at least two edges of the front face of the billboard body.

In some embodiments, the method comprises setting the area of each of the plurality of color blocks to be no more than ½₀ of the area of the front face of the billboard body. In some embodiments, the method comprises setting the area of each of the plurality of color blocks to be no more than ¹⁄₄₀ of the area of the front face of the billboard body.

In some embodiments, the method comprises setting the area of each of the locating geometric graphic blocks to be no more than ½₀ of the area of the front face of the billboard body. In some embodiments, the method comprises setting the area of each of the locating geometric graphic blocks to be no more than ¹⁄₄₀ of the area of the front face of the billboard body.

In some embodiments, the method comprises setting the number of the plurality of color blocks to be greater than or equal to 3. Preferably, the method comprises setting the number of the plurality of color blocks to be 6, 8, 9, 10, 11, 12, 13, 14, 15 or 16.

In some embodiments, the method comprises setting the area of the front face of the billboard body to be larger than 0.2 m². In some embodiments, the method comprises setting the area of the front face of the billboard body to be larger than 0.5 m².

A billboard containing encoded information of the present invention allows a user to scan, identify and decode the billboard at a normal viewing distance so as to obtain encoded information, and improve user operation experience. In the meantime, the billboard of the present invention can also be saved to the mobile terminal by taking a picture, etc., and can be uploaded to a cloud server end, and can be re-scanned and identified to serve as an index. Moreover, a corresponding website link can be added after indexing in order to enable users to readily access to the corresponding web page when they share or search an image, thereby further improving the publicity effect of an advertisement.

DESCRIPTION OF THE DRAWINGS

In order to understand the manner in which embodiments of the present invention are obtained, a more particular description of various embodiments of the invention briefly described above will be rendered by reference to the appended drawings. Understanding that these drawings depict only typical embodiments of the invention that are not necessarily drawn to scale and are not therefore to be considered to be limited of its scope, the embodiments of the invention will be described and explained with additional features and details through the use of the accompanying drawings, in which.

DETAILED EMBODIMENTS

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein, in connection with one embodiment, may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled.

A normal viewing distance described in this article is in line with a person's common viewing distance in daily life, and in some embodiments, the viewing distance may be 1 to 10 times the diagonal length of a front face of a billboard. In other embodiments, the viewing distance may be 1.5 to 4 times the diagonal length of a front face of a billboard. The present invention is not limited thereto.

Figure 1:
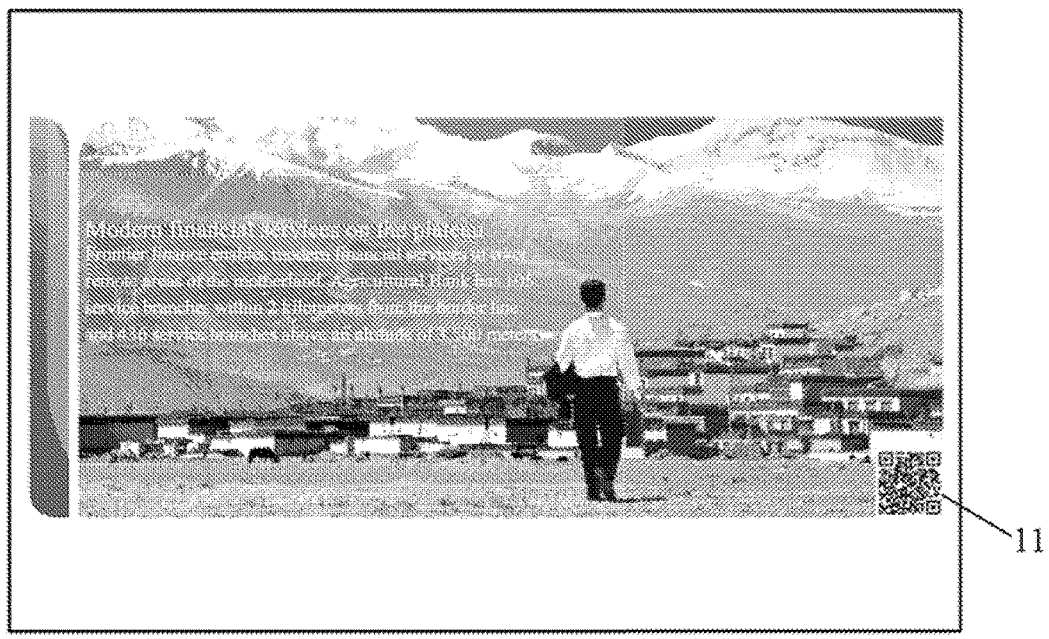
FIG. 1 shows a schematic illustration of a traditional billboard 10 having a two-dimensional code.

FIG. 1 shows a schematic illustration of a traditional billboard 10 having a two-dimensional code. Wherein the two-dimensional code 11 is placed in the lower right corner of the billboard 10. The two-dimensional code 11 is generally a DM code or a QR code. Since the size of the two-dimensional code is small, a user needs to move a mobile device (for example, a smart phone, etc.) close to a photo on the billboard 10 to make the two-dimensional code substantially occupy the entire scanning frame of the mobile device so as to scan a code. In case, for example, an entire billboard image is captured at a normal distance. Since the area ratio of the two-dimensional code 11 to the entire billboard is too small, so that the two-dimensional code 11 cannot be recognized by a mobile device (for example, a phone). However, if the area of the two-dimensional code 11 is enlarged to a size that can be recognized at a normal viewing distance, valuable and effective advertisement area will be compromised inevitably.

Figure 2:
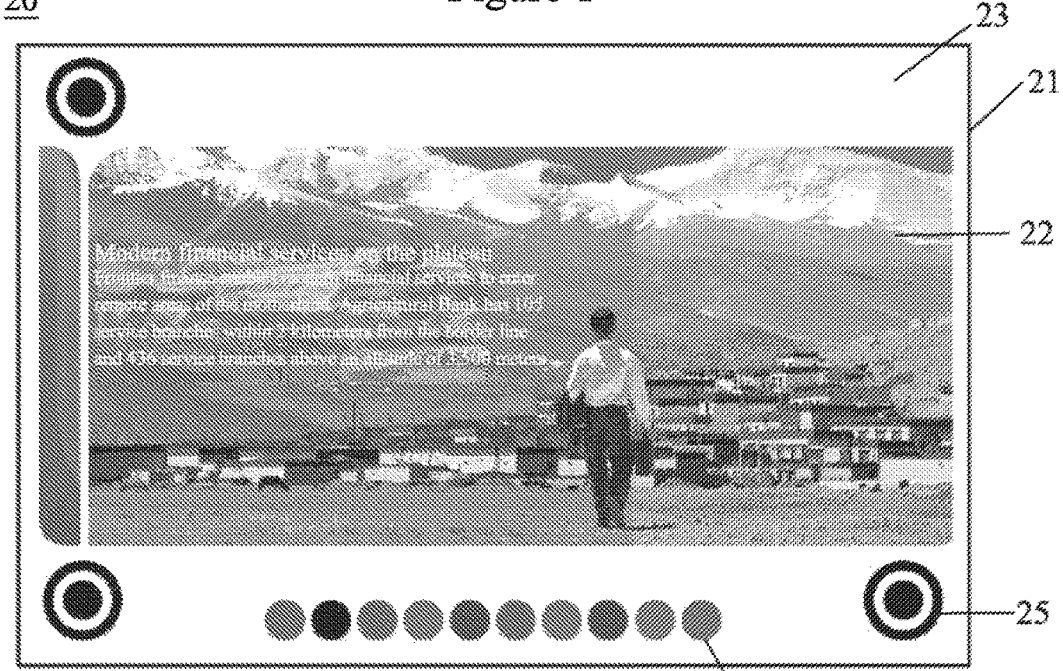
FIG. 2 shows a schematic illustration of a billboard 20 according to an embodiment of the present invention.

FIG. 2 shows a schematic illustration of a billboard 20 according to an embodiment of the present invention. Wherein the billboard 20 comprises a billboard body 21 and a substantially rectangular front face 23 that presents advertisement content 22. The billboard 20 includes a plurality of color blocks 24 distributed along with a lower edge of the front face 23, wherein the plurality of color blocks 24 are encoded as color geometric graphic code elements and the front face 23 may be optically identified and decoded to obtain the encoded information when it was captured by a mobile terminal, and wherein the encoded information, or the information decoded by the mobile terminal and imported to a web page, is associated with the advertisement content 22. The billboard 20 also includes three locating geometric graphic blocks 25 as locating code elements, and wherein the three locating geometric graphic blocks 25 are disposed respectively in three corners of the front face 23.

Those skilled in the art will understand that a front face of a billboard of the present invention may adopt any geometric shape, which comprises a rectangle, a triangle, a diamond, an other parallelogram, a trapezoid, an other polygon, a circle, a semicircle, an ellipse, or a semi-ellipse, etc. Those skilled in the art will also understand that the front face may have any area. Preferably, the area of the front surface is larger than 0.2 m$^2$, and more preferably, the area of the front surface is larger than 0.5 m$^2$.

The term "polygon" herein refers to a closed pattern consisting of three or more line segments that are on a same plane and are not in a same line, which are connected end to end in sequence and do not intercept.

Color blocks of the present invention may be encoded as color geometric graphic code elements. The code elements may be optically read and recorded in a clockwise, a counterclockwise, or a preset mode. Each color block may be of any geometric shapes (for example, a circle, an ellipse, a square, a rectangle, a triangle, an other polygon, or an irregular shape, etc.), and colors or a combination of the colors, and each color block may be encoded/decoded according to shape, color, and location thereof. The shapes or colors of a plurality of color blocks may be substantially same and also may be not the same. Preferably, a billboard of the present invention has color blocks with at least 4 different colors (for example, red, blue, green, and black), but the present invention is not limited thereto.

According to one embodiment of the present invention, each color block individually covers a part of a billboard and does not overlap each other. Theoretically, there may be a small fraction of overlap between color blocks, and the requirement is that the overlap does not affect optical reading. It will be easily understood by those skilled in the art that the number and the distribution locations of the color blocks on a billboard may be adjusted according to actual needs. Specifically, the number of the color blocks may be any number from 3 to 40, but the invention is not limited thereto.

Figure 3:
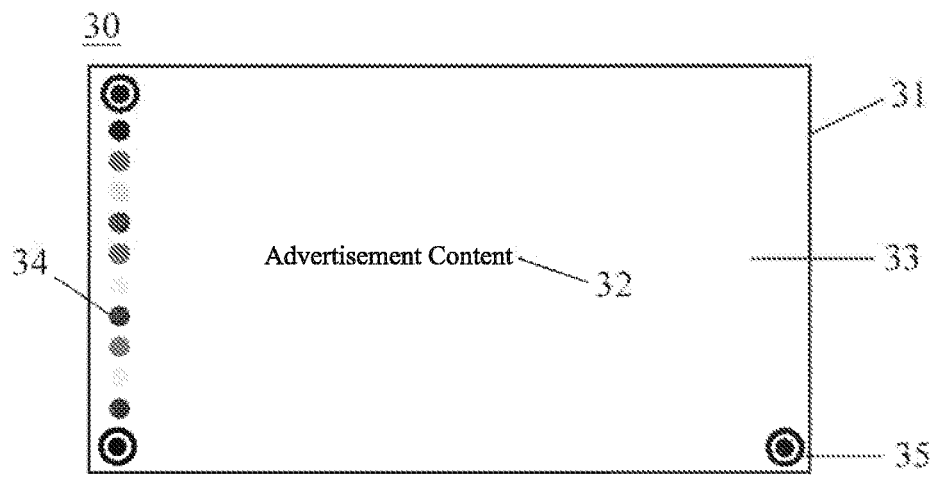
FIG. 3 shows a schematic illustration of a billboard 30 according to an embodiment of the present invention.
Figure 4:
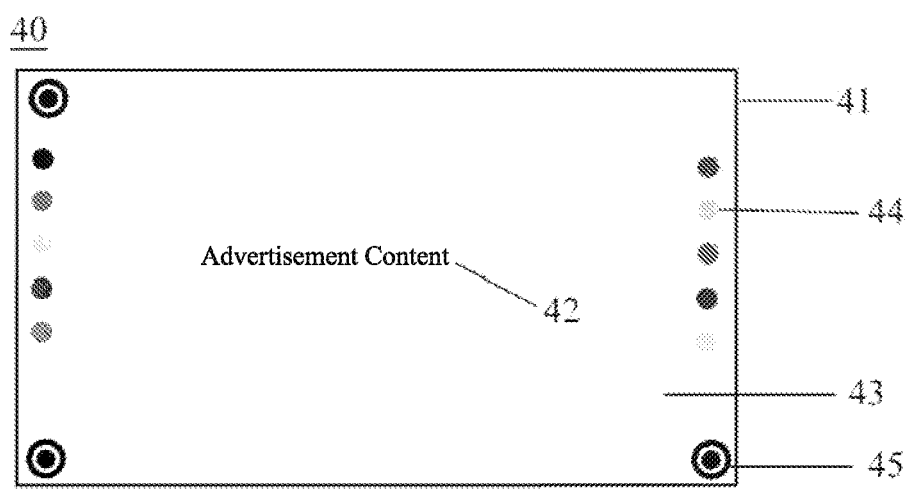
FIG. 4 shows a schematic illustration of a billboard 40 according to an embodiment of the present invention.
Figure 5:
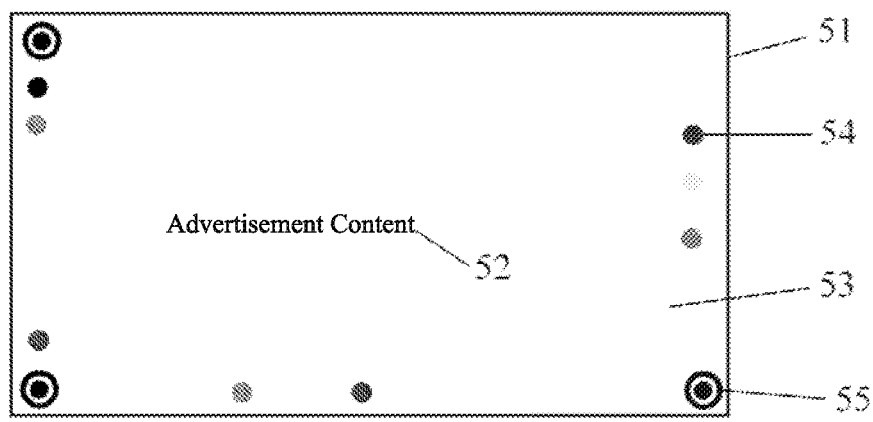
FIG. 5 shows a schematic illustration of a billboard 50 according to an embodiment of the present invention.
Figure 6:
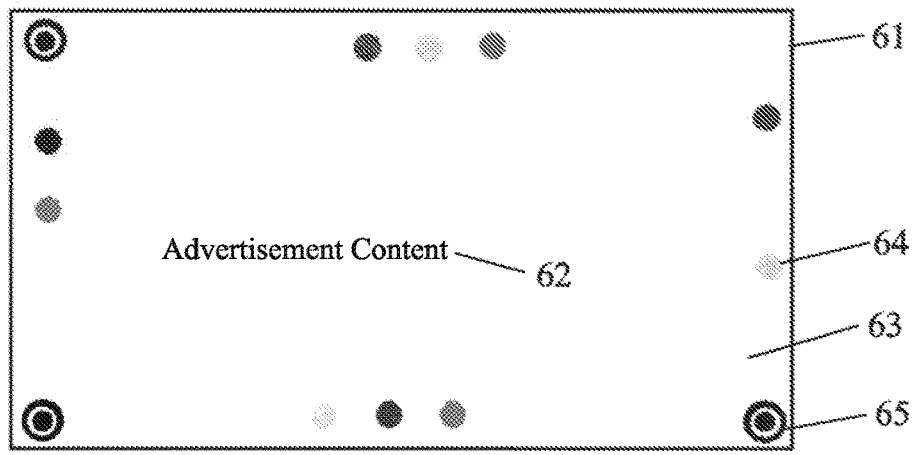
FIG. 6 shows a schematic illustration of the billboard 60 according to an embodiment of the present invention.

Color blocks may be distributed on any locations on a front face of a billboard. For example, the colored blocks may be distributed along with any edge of a billboard (as shown in FIG. 2 and FIG. 3), and also may be distributed along with a plurality of edges of a billboard (as shown in FIG. 4, FIG. 5 and FIG. 6). The color blocks may even be distributed in a center area of a billboard, covering part of the advertisement content, as long as the color blocks do not affect the advertisement content and can be distinguished from surrounding advertisement content so as to be identified. The size of a spacing between the color blocks may also be determined as needed, and the spacing may be substantially the same (as shown in FIGS. 2-4) or may be not the same (as shown in FIG. 5). The area of each of the color blocks may be determined by an actual situation. In a preferred embodiment of the present invention, the area of each of a plurality of color blocks is no more than 1/20 of the area of a front face of a billboard body. In other preferred embodiments of the invention, the area of each of a plurality of color blocks is no more than 1/40 or 1/60 of the area of a front face of a billboard body. In addition, the area of each of the color blocks may be substantially the same (as shown in FIGS. 2-6), and may also be not the same. For example, the area of the plurality of color blocks may gradually become larger or smaller, or may be changed in intervals, but the present invention is not limited thereto. Preferably, the area of a smallest color block is no less than 1/4 or 1/2 of the area of a biggest color block.

For further detailed description of color blocks as encoded code elements in the present invention, please refer to the applicant's Chinese patent application No. 201410432964.3 entitled "Information interaction method and information interaction system" filed on Aug. 28, 2014, and the applicant's Chinese patent application No. 201510618126.X entitled "A composite mark and a method of forming the composite mark" filed on Sep. 24, 2015, and both of these applications are incorporated herein by reference in their entireties.

In some embodiments of the present invention, the number of locating geometric graphic block as locating coded elements may be 0, 1, 2, 3 or 4, and preferably 3. For specific locating methods, please refer to Chinese patent application No. 201410432964.3.

A plurality of color blocks of the present invention may be lithographed, printed, sprayed, pressed, engraved, glued, etched, projected or removably and magnetically attached on a front face, but the present invention is not limited thereto.

The "lithographing" described herein refers to a technique of using conventional printing plates or other methods to transfer graphic information on an original document to a substrate. The "printing" described herein refers to a technique of using a computer or other electronic devices to output visible data such as text or pictures through a printer or the like.

FIG. 3 shows a schematic illustration of a billboard 30 according to an embodiment of the present invention. Wherein the billboard 30 includes a billboard body 31 and a substantially rectangular front face 33 that presents advertisement content 32. The billboard 30 also includes a plurality of color blocks 34 that are distributed along with the left edge of the front face 33. The billboard 30 also includes three locating geometric graphic blocks 35 as locating code elements, wherein the three locating geometric graphic blocks 35 are disposed respectively in three corners of the front face 33.

FIG. 4 shows a schematic illustration of a billboard 40 according to an embodiment of the present invention. Wherein the billboard 40 includes a billboard body 41 and a substantially rectangular front face 43 that presents advertisement content 42. The billboard 40 also includes a plurality of color blocks 44 that are distributed along with the left and right edges of the front face 43. The billboard 40 also includes three locating geometric graphic blocks 45 as locating code elements, wherein the three locating geometric graphic blocks 45 are disposed respectively in three corners of the front face 43.

FIG. 5 shows a schematic illustration of a billboard 50 according to an embodiment of the present invention. Wherein the billboard 50 includes a billboard body 51 and a substantially rectangular front face 53 that presents advertisement content 52. The billboard 50 also includes a plurality of color blocks 54 that are distributed along with the left, right and lower edges of the front face 53. The billboard 50 also includes three locating geometric graphic blocks 55 as locating code elements, wherein the three locating geometric graphic blocks 55 are respectively disposed in three corners of the front face 53.

FIG. 6 shows a schematic illustration of a billboard 60 according to an embodiment of the present invention. Wherein the billboard 60 includes a billboard body 61 and a substantially rectangular front face 63 that presents advertisement content 62. The billboard 60 also includes a plurality of color blocks 64 that are distributed along with the left, right, upper and lower edges of the front face 63. The billboard 60 also includes three locating geometric graphic blocks 65 as locating code elements, wherein the three locating geometric graphic blocks 65 are disposed respectively in three corners of the front face 63.

Figure 7:
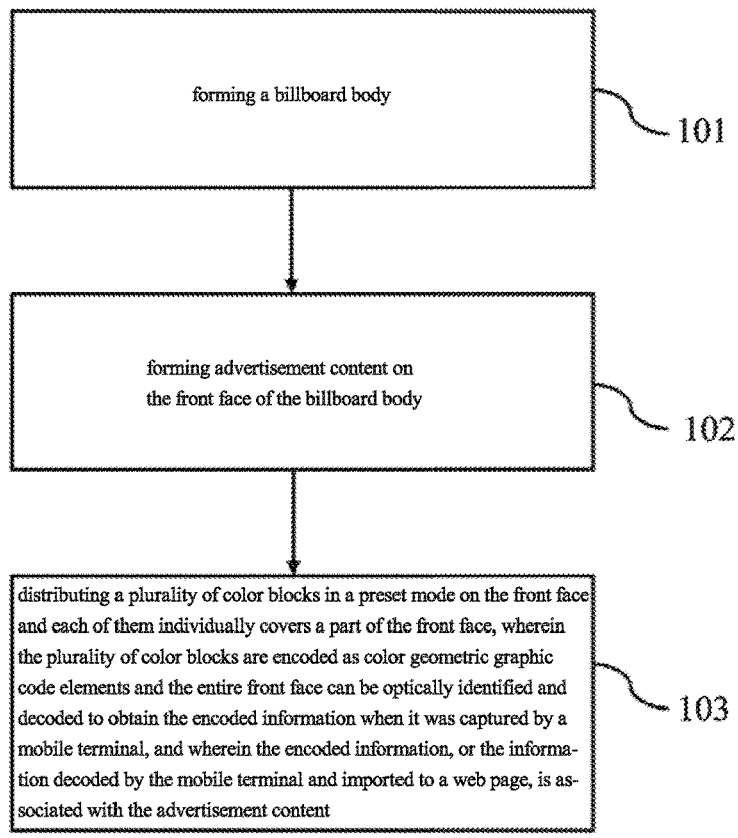
FIG. 7 shows a schematic illustration of a method 100 of forming a billboard containing encoded information according to an embodiment of the present invention.

FIG. 7 shows a method 100 of forming a billboard with encoded information according to an embodiment of the present invention, and the method comprises following steps: forming a billboard body (step 101); forming advertisement content on a front face of the billboard body (step 102); distributing a plurality of color blocks in a preset mode on the front face and each of them individually covers a part of the front face. Wherein the plurality of color blocks are encoded as color geometric graphic code elements and the entire front face can be optically identified and decoded to obtain encoded information when it was captured by a mobile terminal, and wherein the encoded information, or information decoded by the mobile terminal and imported to a web page, is associated with the advertisement content (step 103). Wherein the steps 101 and 102 may also be completed in one step.

Those skilled in the art will understand that the method of the present invention for forming a billboard with encoded information may include corresponding operation steps of forming various billboards according to the present invention in the embodiments described above.

Compared to existing billboards with small-size two-dimensional codes, a billboard of the present invention uses color blocks distributed over a wide range as code elements to encode, allowing a user to capture and identify the entire billboard at a normal viewing distance to obtain encoded information so as to achieve long-distance and normal viewing distance code-scanning interaction, and greatly improve the user operation experience. Since the encoded information in an entire billboard image captured and stored in a storage is completely preserved, the entire billboard image stored in the storage itself can be electronically indexed conveniently. In addition, if the entire billboard image captured and stored in the storage is displayed on a mobile device, a computer screen, or other electronic screen at a certain scale, the redisplayed billboard image can still be optically identified.

The present invention includes a variety of operations. The operations of the present invention may be performed by hardware components or may be included in machine-executable content. The machine-executable content may be used to enable a general-purpose or special-purpose processor or logic circuit programmed by the instructions to perform the operations. Alternatively, the operations may be performed with a combination of hardware and software. In addition, while the invention has been described in the context of a computing device, those skilled in the art will realize that such functionality may be practiced with any of a variety of alternative embodiments appropriately.

The inventions are not restricted to the particular details listed herein. Actually, those skilled in the art having the benefit of this disclosure will understand that many other variations from the foregoing description and drawings may be made within the scope of the present inventions. Accordingly, it is the following claims including any amendments thereto that define the scope of the inventions. The terms and expressions which have been employed herein are used as terms of description and not of limitation, and there is no intention, in the use of such terms and expression, of excluding any equivalents (or accordingly a part) of the features shown and described, and it is recognized that various modifications, variations, alternatives, and equivalents are possible within the scope of the claims. Accordingly, the claims are intended to cover all such modifications, variations, alternatives, and equivalents.

What is claimed is:

1. A billboard containing encoded information, the billboard comprising:
   a billboard body having a front face presenting advertisement content;
   a plurality of color blocks, the plurality of color blocks being distributed in a preset mode on the front face and each of which individually covering a part of the front face,
   wherein the plurality of color blocks are encoded as color geometric graphic code elements and the entire front face can be optically identified and decoded to obtain the encoded information when captured by a mobile terminal, and wherein the encoded information, or the information decoded by the mobile terminal and imported to a web page, is associated with the advertisement content.

2. The billboard as claimed in claim 1, wherein the front face of the billboard body is substantially rectangular.

3. The billboard as claimed in claim 2, further comprising at least one locating geometric graphic block as a locating code element.

4. The billboard as claimed in claim 3, wherein the at least one locating geometric graphic block is of three locating geometric graphic blocks, and wherein the three locating geometric graphic blocks are disposed respectively in three corners of the front face.

5. The billboard as claimed in claim 3, wherein the area of each of the locating geometric graphic blocks is no more than $1/20$ of the area of the front face of the billboard body.

6. The billboard as claimed in claim 5, wherein the area of each of the locating geometric graphic blocks is no more than $1/40$ of the area of the front face of the billboard body.

7. The billboard as claimed in claim 2, wherein the plurality of color blocks are distributed along with at least one edge of the front face of the billboard body.

8. The billboard as claimed in claim 2, wherein the plurality of color blocks are distributed along with at least two edges of the front face of the billboard body.

9. The billboard as claimed in claim 1, wherein the front face of the billboard body is a surface of an object, and the front face presents substantially a plane.

10. The billboard as claimed in claim 1, wherein the billboard body is made of a flexible material or a rigid material.

11. The billboard as claimed in claim 1, wherein the plurality of color blocks are lithographed, printed, sprayed, pressed, engraved, glued, etched, projected or removably and magnetically attached on the front face.

12. The billboard as claimed in claim 1, wherein the shape of the plurality of color blocks is substantially the same, and the shape is a circle, a polygon, a semi-circle, an oval, a semi-oval or a combination thereof.

13. The billboard as claimed in claim 12, wherein the polygon comprises a triangle, a square, a rectangle or a trapezoid.

14. The billboard as claimed in claim 1, wherein the area of each of the plurality of color blocks is not the same, and wherein the area of the smallest block is no less than $\frac{1}{4}$ of the area of the biggest block.

15. The billboard as claimed in claim 1, wherein the area of each of the plurality of color blocks is the same.

16. The billboard as claimed in claim 1, wherein the area of each of the plurality of color blocks is no more than $\frac{1}{20}$ of the area of the front face of the billboard body.

17. The billboard as claimed in claim 16, wherein the area of each of the plurality of color blocks is no more than $\frac{1}{40}$ of the area of the front face of the billboard body.

18. The billboard as claimed in claim 1, wherein number of the plurality of color blocks is greater than or equal to 3.

19. The billboard as claimed in claim 1, wherein number of the plurality of color blocks is 6, 8, 9, 10, 11, 12, 13, 14, 15 or 16.

20. The billboard as claimed in claim 1, wherein the mobile terminal is a smart phone.

21. The billboard as claimed in claim 1, wherein the area of the front face of the billboard body is larger than 0.2 m$^2$.

22. The billboard as claimed in claim 1, wherein the area of the front face of the billboard body is larger than 0.5 m$^2$.

* * * * *